US005737426A

United States Patent [19]

Brookner et al.

[11] Patent Number: 5,737,426

[45] Date of Patent: Apr. 7, 1998

[54] REMOTE AND SECURE FEATURE ENABLING FOR AN ELECTRONIC POSTAGE METER

[75] Inventors: George M. Brookner, Norwalk; Hyung-Kim Paul Kim, Wilton, both of Conn.

[73] Assignee: Pitney Bowes Inc., Stamford, Conn.

[21] Appl. No.: 357,175

[22] Filed: Dec. 13, 1994

[51] Int. Cl.[6] .............................. H04L 9/00; G06F 17/00

[52] U.S. Cl. .................................. 380/51; 380/4; 380/9; 380/23; 380/25; 380/49; 380/55; 364/464.11; 364/464.15

[58] Field of Search .............................. 380/4, 9, 23, 25, 380/49, 50, 51, 55, 59; 364/464.1, 464.11, 464.15, 464.2

[56] References Cited

U.S. PATENT DOCUMENTS

| | | | |
|---|---|---|---|
| 3,792,446 | 2/1974 | McFiggind et al. . | |
| 4,937,864 | 6/1990 | Caseiras et al. | 380/4 |
| 5,206,812 | 4/1993 | Abumehdi | 334/464.02 |
| 5,499,295 | 3/1996 | Cooper | 380/23 |

FOREIGN PATENT DOCUMENTS

| | | | |
|---|---|---|---|
| 0285390 | 10/1988 | European Pat. Off. | G07B 17/02 |

*Primary Examiner*—Bernarr E. Gregory

*Attorney, Agent, or Firm*—Angelo N. Chaclas; Charles G. Parks, Jr.; Melvin J. Scolnick

[57] ABSTRACT

The postage metering system includes a postage meter in bus communication with an external interface unit. The postage meter operates under the control of a programmable micro control system which is responsive to a number of postage meter program routines stored in the program memory of the meter micro control system. The postage meter also includes a principal communication port in bus communication with the micro control system and a keyboard also in bus communication with the meter micro control system for providing operator instruction to the micro control system. An external interface unit which includes a micro control system responsive to one or more of a program routines stored in the program memory of the external interface unit. The external interface further includes a postage meter port and a plurality communication ports. The postage meter port of the external interface unit is in bus communication with the principal communication port of the postage meter. The postage meter is programmed to be responsive to encrypted operator instructions inputted through the keyboard to enabling one or more of the postage meter program routines, and generating external interface unit instruction messages in response to the operator instruction. The external interface unit is programmed to be responsive to the instruction messaged from the postage meter to enable one or more of the external interface unit program routines.

4 Claims, 3 Drawing Sheets

REMOTE AND SECURE FEATURE ENABLING FOR AN ELECTRONIC POSTAGE METER

BACKGROUND OF THE INVENTION

The present invention relates to micro control devices having the capability of communicating with an external device through a communication port and, more particularly, to postage meters, and like devices, having a micro control system enclosed in a secured housing wherein the micro control system is suitable for communication secured or unsecured information through a communication port between the meter and the external device.

It is known to provide a postage meter with a number of communication ports, for example, a port for secure communication between the meter's secure printing and accounting system with an external device, such as an echoplex scale, and one or more ports for non-secured communication, such as, with a printer and modem. An echoplex scale refers to a scale with the ability to set the meter's posting amount using a secure communication protocol, such as described in U.S. Pat. Nos. 4,301,507 and 4,395,756. An example of unsecured communication is the use of a standard RS232 protocol for the printing of unsecured departmental account information by an external printer.

Providing a meter with full communication capability presents a cost consequence to the user which the user, in many instances, wishes to defer until such time as the user can cost justify the additional capabilities and features. The user would also like to obtained the deferred features at an incremental cost. Providing a meter with communication upgradeability also presents substantial issues to the meter manufacturer. For example, it is known to provide electronic postage meters with remote resetting capability. This process provides a way of increasing the amount of funds available in the accounting memory registers of the electronic postage meter, referred to as meter recharge. One of the methods available for recharging the meter allows the user to telecommunicate with a data center operated by the meter manufacturer and, through the exchange of information, the operator receives a code which is keyed into the meter through the meter keyboard resulting in recharge of the meter. A more detailed description of the recharge process is set forth in U.S. Pat. Nos. 4,280,179 and 3,792,446 (McFiggans). The standard recharge configuration requires physical, transport of the meter to the postal authorities for manual reset. Conventionally, postage meters cannot be upgraded except upon return to the service center of the manufacturer. It is customary for the manufacturer to trade out the customer's meter for an increased feature meter in order to meet the customer's present requirements. In addition, the manufacturer must update its record to reflect the customer's metering capabilities. As a result, the practice of trading out meters consequently requires the manufacturer to maintain a considerable inventory of full feature meter and substantial increase procedures for maintaining accurate records.

SUMMARY OF THE INVENTION

It is an objective of the present invention to present an external interface unit (EIU) which can be attached to a communication port of a meter to provide additional functionality to the meter.

It is a further objective of the present invention to present an external interface unit (EIU) which can be attached to a communication port of a meter to provide additional functionality to the meter in a manner which provides a means of assuring that the manufacturer may identify the EIU functionality with a particular meter.

It is still a further objective of the present invention to present an external interface unit (EIU) which can be attached to a communication port of a meter to provide additional functionality to the meter in a manner which provides a means of assuring that the manufacturer may identify the EIU functionality with a particular meter.

The postage meter includes a micro control system comprised of a microprocessor in bus communication with an application specific integrated circuit (ASIC), a program memory (PROM), a random access memory (RAM), and a plurality of non-volatile memories housed within a secured housing. Also in independent bus communication with the ASIC is a communication port. The ASIC includes a security circuit which prevents access to the non-volatile memories, securing the nonvolatile memories. Stored in the secured non-volatile memories is an EIU authorization decryption algorithm which responds to encrypted authorization code received from the manufacturer. The manufacturer maintains the encrypting algorithm.

When the customer wishes to increase the functionality of the meter, a EIU is attached to the communication to the standard communication port of the postage meter. The customer then telecommunicates with the manufacturer's data center. The customer then conveys the meter's serial number, EIU product code number and the feature set request. The manufacturer then derives an encrypted authorization code based upon an assigned authorization level for the feature requested feature set, the meter serial number and the product code number (PCN), and conveys the encrypted authorization code to the customer. The customer then places the meter in a special mode and keys in the authorization code causing the meter. The meter programming the decrypts then authorization code to derive the meter's serial number, PCN number and authorization level. The meter then confirms the serial number and PCN number pursuant to which the requested feature set is enable.

The EIU includes a micro controller in buses to a series of four external ports. One of the ports is a conventional protocol port which permits communication between the EIU and the postage meter. In the preferred embodiment, the protocol utilized is a variation of the standard RS 232. Alternatively, communication between the EIU and the meter may employ a suitably security communication protocol, such as a protocol referred echoplex described in U.S. Pat. No 4,395,756. A second port is a echoplex port, specifically adapted by of an echoplex control ASIC within the EIU to communicate with an echoplex device, such as an echoplex scale. A third and fourth port is provided for facilitating communication between any suitable device such as a modem, computer or an additional scale. Each of the ports communicate with the meter through the EIU micro controller and a suitable integrated circuit (ASIC). Upon power-up of the EIU, the EIU requests an enabling signal from the meter, and the meter can then respond with the appropriate authorization level signal to enable the feature set.

The EIU is programmed to operate in three communication modes which are enabled in response to the appropriate authorization code. A passive routing mode in which the software programmed into PROM of the EIU instructs the micro controller to route any incoming message to be outputted without modification at the meter port. When the EIU operates in passive routing mode, any responses from the meter, which in the native mode is provided using an echoplex protocol, are routed by the EIU micro controller and are sent to the second and fourth ports which are principally intended to be associated with a scale, however the fourth may have other devices connected thereto. Since, only the echoplex scale can understand the response, and the respective ports are connected to different pins of the micro controller, the micro controller is able to discriminate based on the destination port protocol between echoplex scale devices attached to the second port and route outgoing messages from the meter to that port. The passive routing mode operates when other intelligent devices connected to the EIU are silent.

The second mode of communication is referred to as the 'pipe' mode of operation of the EIU. When the EIU is in pipe mode based on a request from one of the external devices, all device communications are routed directly to the meter port and all meter derived communications are routed directly to the port communicating with the requesting device. When the EIU operates in pipe mode, the second (echoplex) port is shut down and requests for connection received via any other port are ignored. When communication between the external device and the meter is complete, a confirmation of completion of message is sent to the EIU. This causes the micro controller of the EIU to return under control of the PROM to passive routing mode, i.e. the default mode of operation.

The third mode of EIU operating is as 'master' mode. This mode is similar to pipe mode in that the EIU becomes a dedicated communications bus, but in master mode the dedicated communications link is between the EIU and the meter. Master mode is of use when it is necessary for the EIU to communicate internally generated messages to the meter. In master mode, the echoplex port and the standard communication ports are effectively closed. In this mode, certain other EIU internal functions can be enabled, for example, departmental accounting functions.

DETAILED DESCRIPTION OF THE PREFERRED EMBODIMENT

Figure 1:
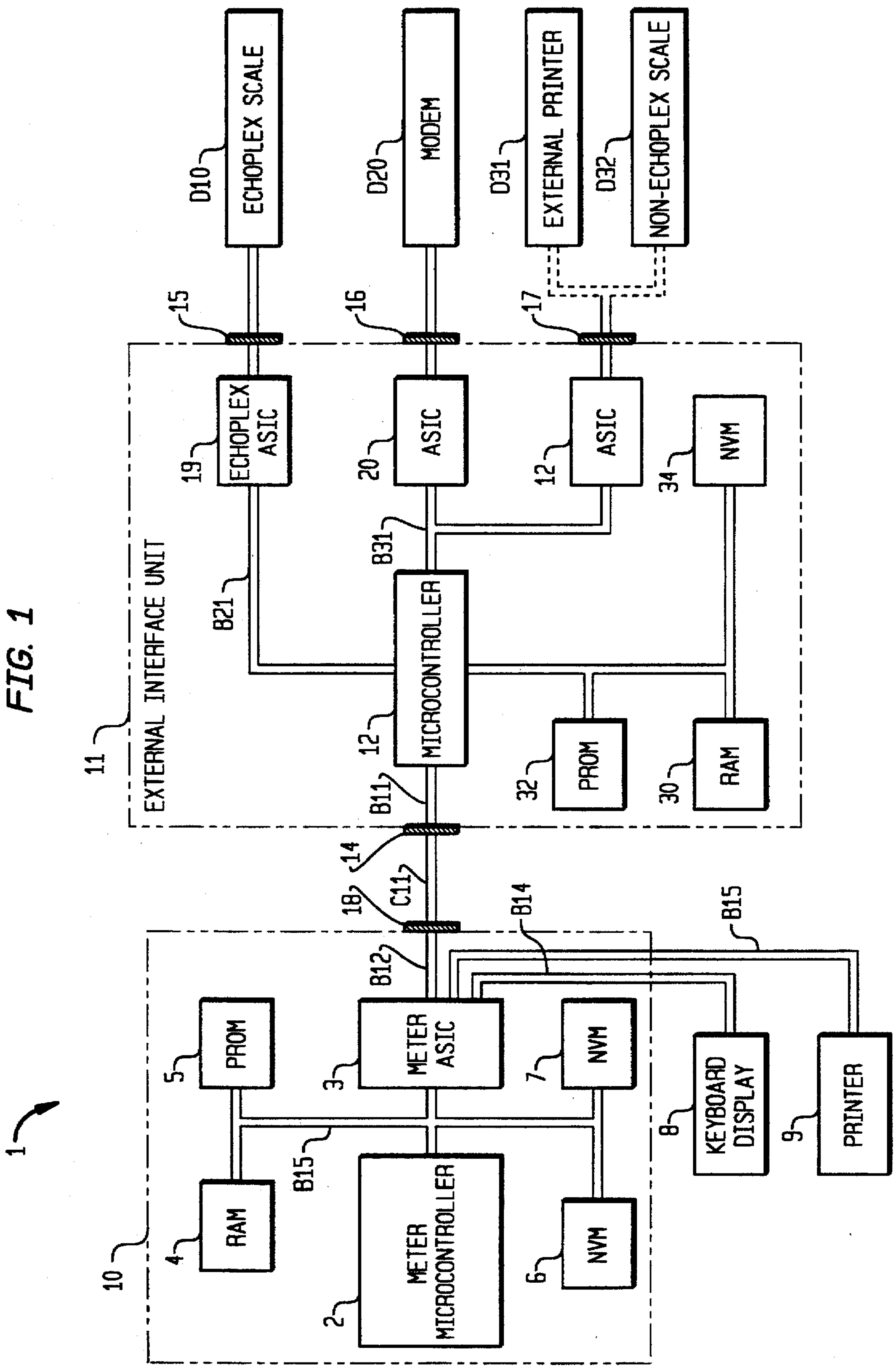
FIG. 1 is a schematic of the meter and EIU in combination in accordance with the present invention.

Referring to FIG. 1, a postage meter 1 is comprised of a micro controller 2 in bus B15 communication with a RAM 4, PROM 5, ASIC 3 and two NVM's 8 and 9 which are housed in a secured housing 10. The ASIC 3 is in bus B14 communication with a keyboard-display 8 and in bus B15 communication with a digital printing unit 9. The ASIC includes a security circuit which prevents access to the non-volatile memories, securing the nonvolatile memories. Stored in the secured non-volatile memories is an EIU authorization decryption algorithm which responds to encrypted authorization code received from the manufacturer. The manufacturer maintains the encrypting algorithm. A more detailed description of the postage meter 1 is presented in U.S. patent application Ser. No. 08/163,790, entitled ADDRESS DECODER WITH MEMORY ALLOCATION FOR A MICRO-CONTROLLER SYSTEM and issued as U.S. Pat. No. 5,530,840, herein incorporated by reference.

The EIU 11 includes a micro controller 12, a number of control ASIC 19, 20 and 21, and number of ports 14, 15, 16, and 17. Port 14 is a dedicated meter port 14 and port 15 is a dedicated echoplex port. Ports 16 and 17 are respectively RS 232 ports suitable for connection to a modem and an RS 232 device such as a printer, a computer or a further (echoplex or non-echoplex) scale. The echoplex port 15 is in bus B22 communication with an echoplex control ASIC 19. In like manner, the port 16 is in bus B32 communication with an ASIC 20 and the port 17 is in bus B33 communication with an ASIC 21. The ASIC 19 is also in communication with a micro controller 12 through a bus B21. The ASIC's 20 and 21 communicate With the micro controller 12 through a bus B31. The meter port 14 communicates directly to the micro controller 12 through a bus B11. Each bus B11, B21 and B31 are at one end connected to individual pins of the micro controller 12.

The EIU further includes a random access memory 30, a program memory 32 and a non-volatile memory 34, all in bus B41 communication to the micro controller 12. One of the functions of the EIU is as a data repository for the meter, facilitated by the communication between the EIU and the meter, the meter can off-load certain system functions as an optional system with the use of an EIU. For example, stored in the EIU's can be nonsecured accounting data, such as, departmental accounts. Also, the EIU may be used to facilitate international marketing by including in the non-volatile memory of the EIU local languages which can be access by the meter's human interface system, a variety of external printer formats. Also, preferably, stored in the non-volatile memory of the EIU are meter error codes which can be accessed through, for instance, the modem port for system diagnostic, miscellaneous meter data and EIU parameters.

Figure 2:
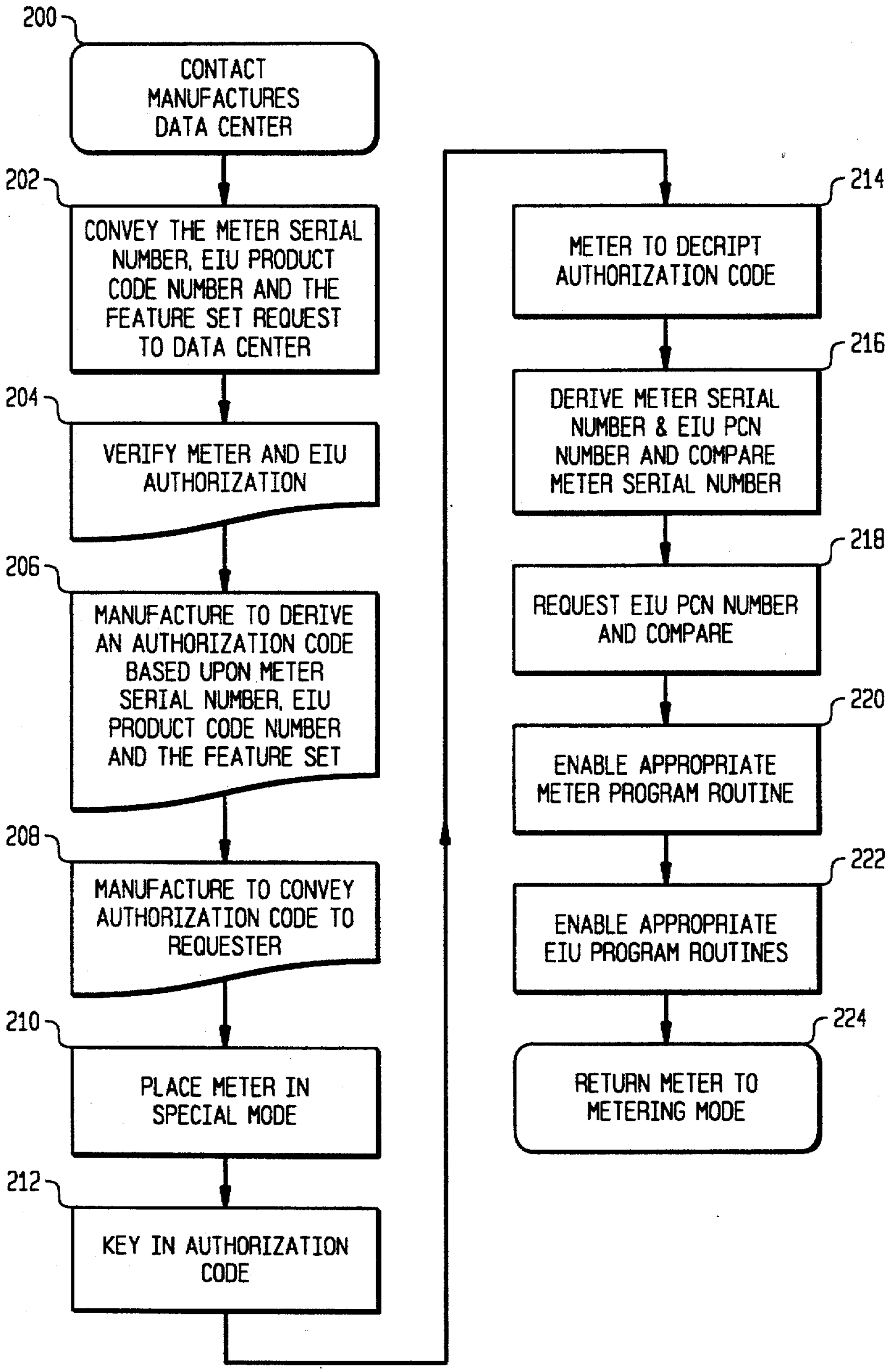
FIG. 2 is a logic flow of the meter-EIU feature enabling logic in accordance with the present invention.

Referring to FIG. 2, when the customer wishes to increase the functionality of the meter 1, an EIU 11 is procured from the manufacturer and the communication port 14 of the EIU 11 is attached to the standard communication port 18 of the postage meter 1, either directly or through a connecting bus C11. The customer or manufacture service representative then telecommunicates with the manufacturer's data center indicated at logic step 200. The customer or service representative then conveys the meter's serial number, EIU product code number and the feature set request at logic step 202. The manufacturer can then review their records to verify that the uses and user of the meter and EIU are authorized at logic step 204. The manufacturer then derives an encrypted authorization code based upon an assigned authorization level for the feature requested feature set, the meter serial number and the product code number (PCN) at logic step 206, and conveys the encrypted authorization code to the customer at logic step 208. Table 1 illustrates an envisioned authorization feature set.

TABLE 1

| Authorization Level | Device/Function Enabled |
|---|---|
| A | Scale |
| B | Device to read Descending Register, Ascending Registers, Piece count, Trip status |
| C | Device to access the departmental accounting data only |
| D | Remote postage recharge of the meter via modem or Local Area Network |
| E | Combination A & B |

TABLE 1-continued

| Authorization Level | Device/Function Enabled |
|---|---|
| F | Combination A & C |
| G | Combination A & D |
| H | Combination B & C |
| I | Combination B & D |
| J | Combination C & D |
| K | Combination A, B & C |
| L | Combination A, B, C & D |
| M | Unlimited system access (only for manufacture service equipment) |

The customer then places the meter in a special mode at logic step 210 and keys in the authorization code 212. The meter programming then decrypts the authorization code to derive the meter serial number, PCN number and authorization level at logic step 214 using any known suitable method such as described in U.S. Pat. No. 3,792,446, entitled REMOTE POSTAGE METER RESETTING METHOD, herein incorporated by reference. The meter programming then confirms the serial number at logic step 216, and then requests the PCN number and confirms the PCN of the EIU 11 at logic step 218. Meter communication with the EIU 11 will be more particularly described subsequently. Pursuant to the confirmation, the appropriate meter program routines are enabled at logic step 220. An encoded message is sent to the EIU 11 over bus C11 which results in enabling the appropriate program routines of the EIU 11 at logic step 222. The meter is then returned to its normal operating mode and logic step 224.

Figure 3:
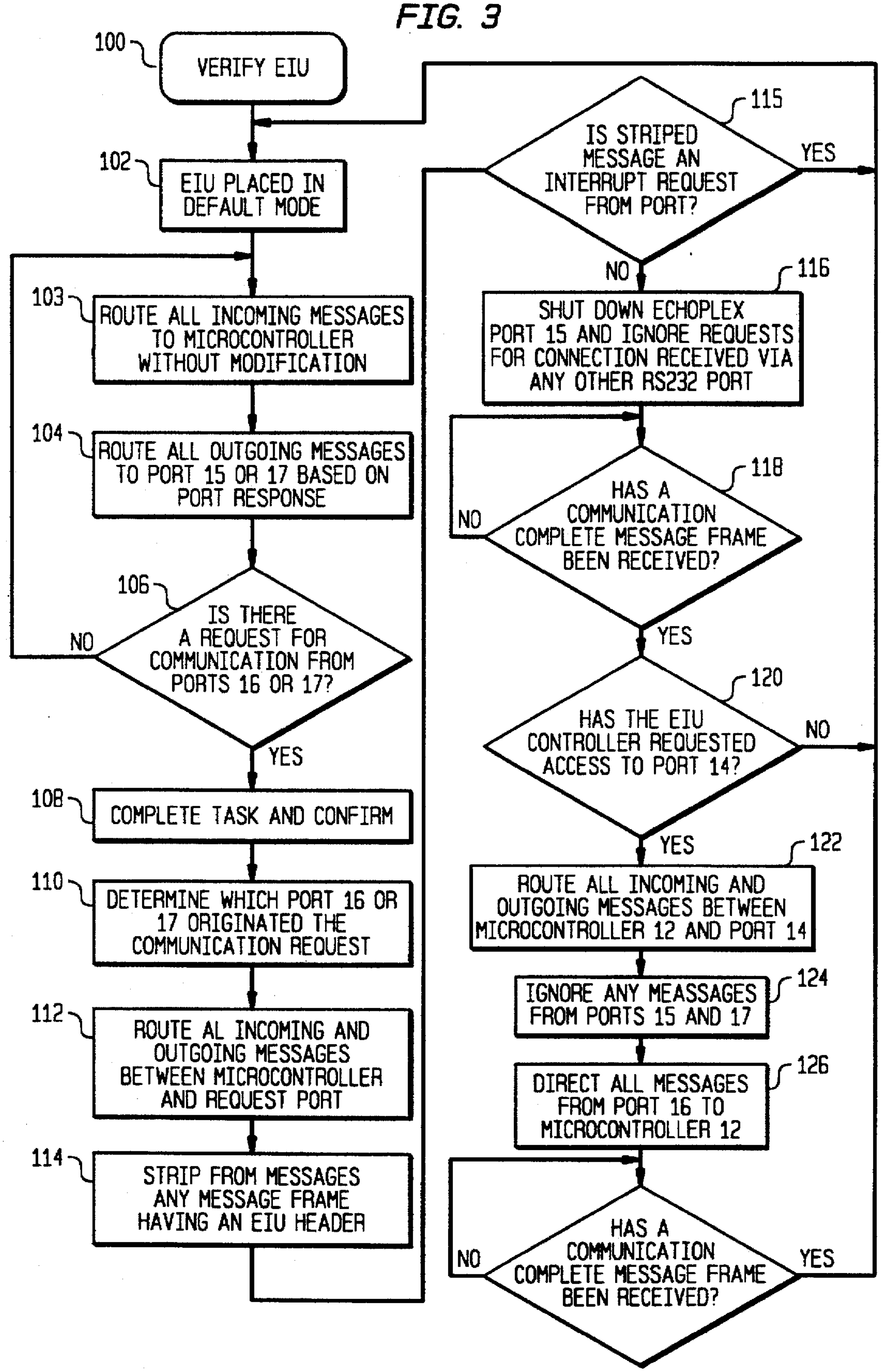
FIG. 3 is logic flow diagram of the operational programming of the EIU in accordance with the present invention.

Referring to FIG. 3, generally, when the EIU is plugged into the communication port of the meter and the meter is powered-up, any suitable verification procedure known to the art is performed at logic step 100. The verification procedure is intended to assure that the designated EIU 11 is being used in combination with the intended meter 1. Once the verification process is completed, the EIU 11 is placed in the default mode or passive routing mode at logic step 102. In the passive routing mode, the EIU 11 is essentially transparent to the devices communicating through it. This mode of operation is intended to permit communication between the meter and a scale. When the meter 1 is in passive routing mode, the software programmed into PROM 32 of the EIU 11 instructs the micro controller 12 to route any incoming scale class messages to be outputted without modification at the meter port 14, for transmission to the meter, at logic step 103. Under normal circumstances, the scale would be connected most probably to port 15, or possibly to port 17. When the EIU 11 operates in passive routing mode, the ports 15 or 17 is connected to a scale. Becoming the default ports are 15 and 17, and any responses from the meter are routed by the micro controller 12 to the ports 15 or 17 at logic step 104. Since the scale connected to port 15 operates using the echoplex or other secured protocol from the scale connected to port 17 and, further in combination, the respective ports 15 and 17 are connected to different pins of the micro controller 12, the micro controller 12 is able to discriminate between the devices attached respectively to the ports 15 and 17 and route outgoing messages from the meter to the appropriate ports 15 or 17.

Passive routing mode operates when other intelligent devices connected to the EIU 11 are silent. Thus, if there is, for example, a scale attached to echoplex port 15, a modem attached to modem port 16 and a computer attached to modem port 17, passive routing mode will only operate when no messages flow via the modem and PC ports 16 and 17. If, for example, a computer is connected to port 17 initiates communication with the EIU 11 with a request for connection to the meter via port 14 at logic step 106, the micro controller acting under the control of PROM 32 sends a command via meter port 14 to the meter 1 to complete the current task and confirm such completion at logic step 108. Otherwise at logic step 106, the control program returns to logic step 103 in the default mode. If the request has been made at logic 106, once the micro controller receives confirmation of completion of the current task from the meter 1, the micro controller determines which port, 16 or 17, has made the request at logic block 110. The EIU 11 then in effect becomes a dedicated communications bus between the requesting port 16 or 17 and meter port 14 at logic block 112. The EIU 11 is now in the second mode of communication, known as the 'pipe' mode of operation of the EIU 11. When the EIU 11 is in pipe mode, all communications from port 16 or 17 are routed directly to the meter port 14 and all meter derived communications are routed directly to the appropriate port 16 or 17.

It is possible that any given message between the device in communication with port 16 or 17 and the meter may include message frames that constitute instructions to the EIU 11 or data to be stored in the EIU's NVM 34. These frames are identified by a EIU header and are automatically stripped by the EIU 11 as the message passes through the micro controller 12 at logic step 114. When the EIU 11 operates in pipe mode, the echoplex port 15 is shut down and requests for connection received via any other RS 322 port are ignored at 116. When communication is completed, the device will send a confirmation of completion message to the EIU 11. Once the message complete is received, the micro controller 12 returns to the passive routing mode, i.e., the default mode of operation at logic step 118. Any RS 322 level device connected either to port 16, or to port 17 could initiate pipe mode as long as the device is programmed to send the correct request for connection to the meter 1. Thus, pipe mode could be initiated remotely via the modem port 16. This would advantageously allow interrogation of the meter 1 from a remote location such as a data center or postal authority office.

The EIU 11 is also capable of operating in a third mode, known as 'master' mode pursuant to the initiation of the EIU micro controller 12 at logic step 120. This mode is similar to pipe mode in that the EIU 11 becomes a dedicated communications bus, but in master mode the dedicated communications link is between the EIU 11 and the meter port at logic step 122. Master mode is of use when it is necessary for the EIU 11 to communicate internally generated messages to the meter 1. This occurs, for example, when the EIU software initiates an accounting (data recording) operation that involves reading the registers of the meter 1 for storage in the EIU's NVM 25. In master mode the echoplex port 15 and the RS 322 port 17 are effectively closed at logic step 124, but the modem port 16 is kept open. All communication from port 16 is directed to the micro controller 12 at logic step 126. This allows data transfer between the modem port 16 and the EIU 11 or the meter 1, according to the EIU command. During remote recharging of the meter 1 the EIU 11 would operate in master mode but modem messages would not pass directly and unaltered to the meter port 14.

As indicated in logic step 114, it is possible to initiate master mode while the EIU 11 is nominally set to pipe mode. This may be regarded as a subset of pipe mode, and permits the transmission of specific control messages, e.g., to the EIU 11 from a computer, for example, connected at port 17.

Under these circumstances, the message from port 17 may include an interrupt request at 115 which then causes the system to enter the default mode. The computer can thereby gain access to the meter through the EIU 11. When a printer is connected to RS 322 port 17, printer messages from the meter to the printer are modified by the EIU 11. Specifically, some HEX bits are stripped from the messages as they pass through the EIU 11, so that only ASCII data is sent to the printer. This avoids the possibility of the printer messages generated in the meter 1 from corrupting the printer commands.

The EIU 11 is capable of converting messages in echoplex protocol received at port 15 to a suitably modified protocol for transmission at port 14, and vice versa. The CPU 12 adds appropriate headers, data size bits and message terminator bits to echoplex (Hex) data, thereby converting echoplex messages into the modified RS232 protocol for communication to the meter, and similarly repackages meter messages into echoplex protocol for communication at Echoplex port 15. The latter operation is accomplished by removal of the headers, data size information and termination messages in the CPU 12. The ASIC simultaneously adjusts the timings between various significant bits in the messages to ensure correct operation.

What is claimed is:

1. A postage metering system having a meter and an electronic interface unit (EIU), said meter being in bus communication with said EIU, comprising:

said meter having
- meter program means for controlling the operation of said meter in response to one or more of a plurality of meter program routines and
- a principal communication port in bus communication with said program means;
- input means in bus communication with said meter program means for providing operator instruction to said meter program means said EIU having

- EIU program means for controlling the operation of said EIU in response to one or more of a plurality of EIU program routines,
- a meter port and a plurality of communications ports, said meter port being in bus communication with said principal communication port of said meter,
- said meter program means being responsive to said operator instructions for enabling one or more of said meter program routines, and generating EIU instruction messages in response to said operator instruction and communication said EIU instruction message to said EIU over said principal communication bus; and,
- said EIU program means being responsive to EIU instruction messages from said meter via said meter port for enabling one or more of said EIU program routines.

2. A postage metering system as claimed in claim 1 wherein said meter has a first mode of operation being responsive to said enabled meter program routine and a second mode of operation for enabling said meter program routines, said second mode being responsive to a particular one of said operator instructions for enabling said meter program routines.

3. A postage metering system as claimed in claim 2 wherein said particular one of said operation instruction is an encrypted instruction, and said meter program means having means for decrypting said encrypted instruction.

4. A postage metering system as claimed in claim 3 wherein said particular one of said operation instruction is comprised of an encrypted combination of a feature enabling set code, meter serial number and EIU identification number.

* * * * *